United States Patent
Hsieh et al.

(10) Patent No.: US 6,867,840 B2
(45) Date of Patent: Mar. 15, 2005

(54) METHOD OF MANUFACTURING A LIQUID CRYSTAL DISPLAY PANEL

(75) Inventors: Jack Hsieh, Taipei Hsien (TW); Tanaka Sakae, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 170 days.

(21) Appl. No.: 10/010,519

(22) Filed: Nov. 12, 2001

(65) Prior Publication Data

US 2002/0171801 A1 Nov. 21, 2002

(30) Foreign Application Priority Data

May 16, 2001 (TW) .......................... 90111692 A (51) Int. Cl.⁷ .......................... G02F 1/13; G02F 1/1341; G02F 1/1339
(52) U.S. Cl. .......................... 349/187; 349/189; 349/190
(58) Field of Search .......................... 349/187, 189–190, 349/153–154, 139, 155–156

(56) References Cited

U.S. PATENT DOCUMENTS

| 5,963,281 A | * 10/1999 | Koons et al. .......................... 349/73 |
| 6,331,884 B1 | * 12/2001 | Masazumi et al. .......................... 349/156 |
| 6,396,559 B1 | * 5/2002 | Kishimoto et al. .......................... 349/156 |
| 2001/0026347 A1 | * 10/2001 | Sawasaki et al. .......................... 349/156 |

FOREIGN PATENT DOCUMENTS

JP        62-089025        4/1987

* cited by examiner

Primary Examiner—Dung T. Nguyen
(74) Attorney, Agent, or Firm—Ladas & Parry LLP (57) ABSTRACT

A method of manufacturing a liquid crystal display panel, comprising the steps of: forming a plurality of pixels on a first substrate; forming a plurality of micro cell structures on the first substrate, wherein each micro cell structure surrounds at least one pixel; forming a first alignment layer on the first substrate; providing the micro cell structures with a liquid crystal by utilizing Ink Jet Printing technology; and combining the first substrate with a second substrate by forming a sealing member therebetween.

28 Claims, 15 Drawing Sheets

METHOD OF MANUFACTURING A LIQUID CRYSTAL DISPLAY PANEL

BACKGROUND OF THE INVENTION

1. Field of the Invention

The invention relates to a method of manufacturing a liquid crystal display panel. In particular, the invention relates to a method of manufacture whereby the steps of forming a plurality of micro-cell structures on one substrate of the display, injecting the liquid crystal into the cells and sealing the two substrates accomplish the manufacture of the liquid crystal display.

2. Description of the Related Art

Figure 1:
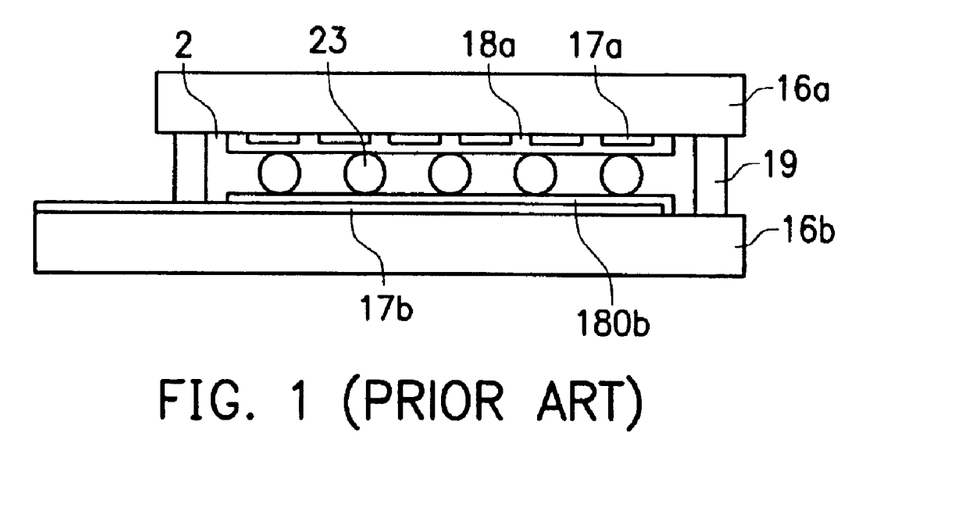
FIG. 1 schematically shows a general structure of a conventional liquid crystal display panel.

FIG. 1 shows a basic structure of the conventional liquid crystal panel. As shown in FIG. 1, a thin layer of liquid crystal 2 is retained between two substrates 16a, 16b by a sealing member 19. The substrate 16a has transparent electrodes 17a formed on regions of the inner surface thereof, with an alignment layer 18a (i.e. for molecular alignment of the liquid crystal) formed over the electrodes and the remainder of the inner surface of the substrate. The substrate 16b is similarly formed with transparent electrodes 17b and alignment layer 18b. Spacers 23 are disposed in the liquid crystal, for maintaining a uniform size of gap between the two opposing surfaces of the substrates.

In general, it is necessary to mutually laterally position the two substrates of a liquid crystal display panel to a very high degree of accuracy, i.e. to position one substrate very precisely above the other. The most popular method of manufacture for such a liquid crystal display panel is as follows. Firstly, an empty cavity is formed, i.e. consisting of the two opposed substrates 16a, 16b accurately mutually aligned, and mutually attached by the sealing member 19 between them, but without the liquid crystal 2. The cavity is then filled with the liquid crystal 2, utilizing a vacuum insertion method, and then sealed. However such a method has various disadvantages, such as a considerable length of time being required to complete the process of filling the cavity with the liquid crystal 2, in the case of a large-size liquid crystal display panel.

Figure 2:
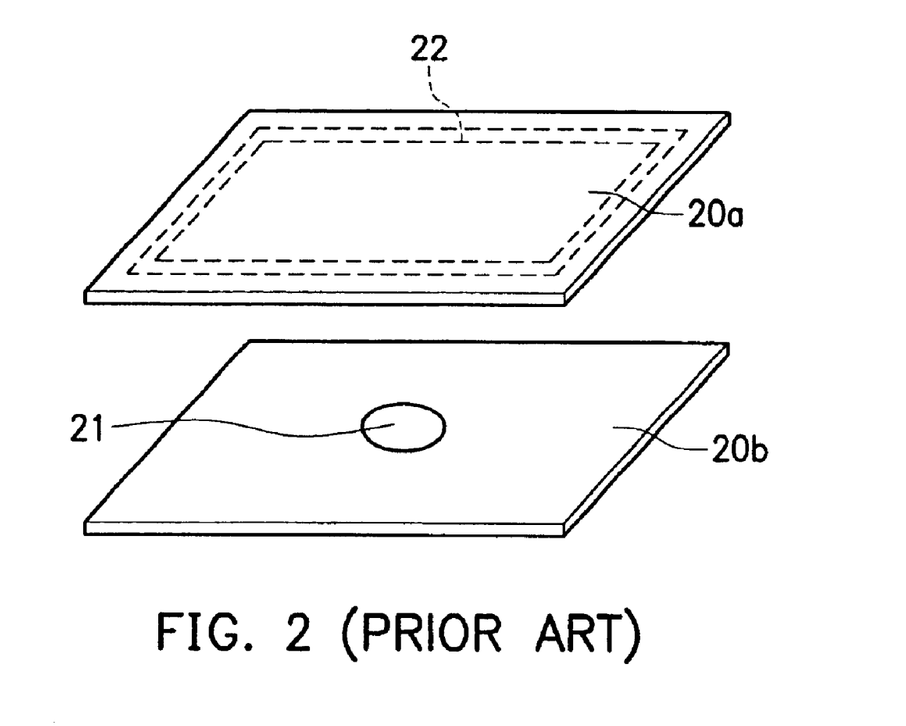
FIG. 2 is a diagram for use in describing a prior art method of manufacture of a liquid crystal display panel.

For that reason, a method of manufacture has been proposed which is based upon first dropping liquid crystal onto a substrate, as described in Japanese Patent Laid-open No. 62-89025. The basic concepts of the "dropping" method are illustrated in FIG. 2, in which a sealing member 22 is formed in a peripheral region of one substrate 20a, while liquid crystal 21 is dropped onto the other substrate 20b. With the two substrates held spaced apart, the substrates are placed within a vacuum chamber of a vacuum assembly apparatus. In that condition (still under atmospheric pressure), the lateral positions of the two substrates 20a, 20b are mutually aligned, i.e. so that the substrate 20a becomes positioned precisely above the substrate 20b. The air pressure within the vacuum chamber is then reduced, and under the condition of the low pressure, the two substrates are brought together so that the substrate 20a becomes superposed on the substrate 20b. Thereafter, the sealing member 22 is hardened, e.g. by application of suitable radiation.

However, with this method, it is necessary to execute very accurate mutual lateral alignment of the two substrates while the substrates are within the vacuum chamber, with the substrates being held apart by only a few millimeters. It is therefore necessary to achieve a positioning accuracy within the range of several microns to several tens of microns, for position adjustment and position control within the vacuum chamber. Hence, the overall size, complexity and cost of a vacuum assembly apparatus that utilizes such a vacuum chamber are excessive. Moreover, this will result in an increase in the most common causes of defects in liquid crystal display panels, i.e. defects due to the presence of dust particles within the panel cavity, short-circuits between the electrodes of the upper and lower substrate, etc.

SUMMARY OF THE INVENTION

To solve the above problems, it is an object of the present invention to provide a method of manufacturing a liquid crystal display panel, comprising the steps of: forming a plurality of pixels on a first substrate; forming a plurality of micro cell structures on the first substrate, wherein each micro cell structure surrounds at least one pixel; forming a liquid crystal material within a plurality of micro cell structures by Ink Jet Printing technology; and combining the first substrate with a second substrate by sealing member.

A feature of the invention is to form the micro cell structures, of photoresist layer or protective layer, on the substrate with thin-film transistors to replace the spacer, wherein each micro cell structure surrounds at least one pixel.

Another feature of the invention is to form the micro cell structures, of photoresist layer or protective layer, on the substrate with color filter to replace the spacer, wherein each micro cell structure surrounds at least one pixel.

Another feature of the invention is to provide the liquid crystal material within each micro cell structure by utilizing Ink Jet Printing technology, including thermal bubble type and micro piezoelectric type Ink Jet Printing technologies.

BRIEF DESCRIPTION OF THE DRAWINGS

This and other objects and features of the invention will become clear from the following description, taken in conjunction with the preferred embodiments with reference to the drawings, in which.

DETAILED DESCRIPTION OF THE PREFERRED EMBODIMENTS

First Embodiment

Figure 3A:
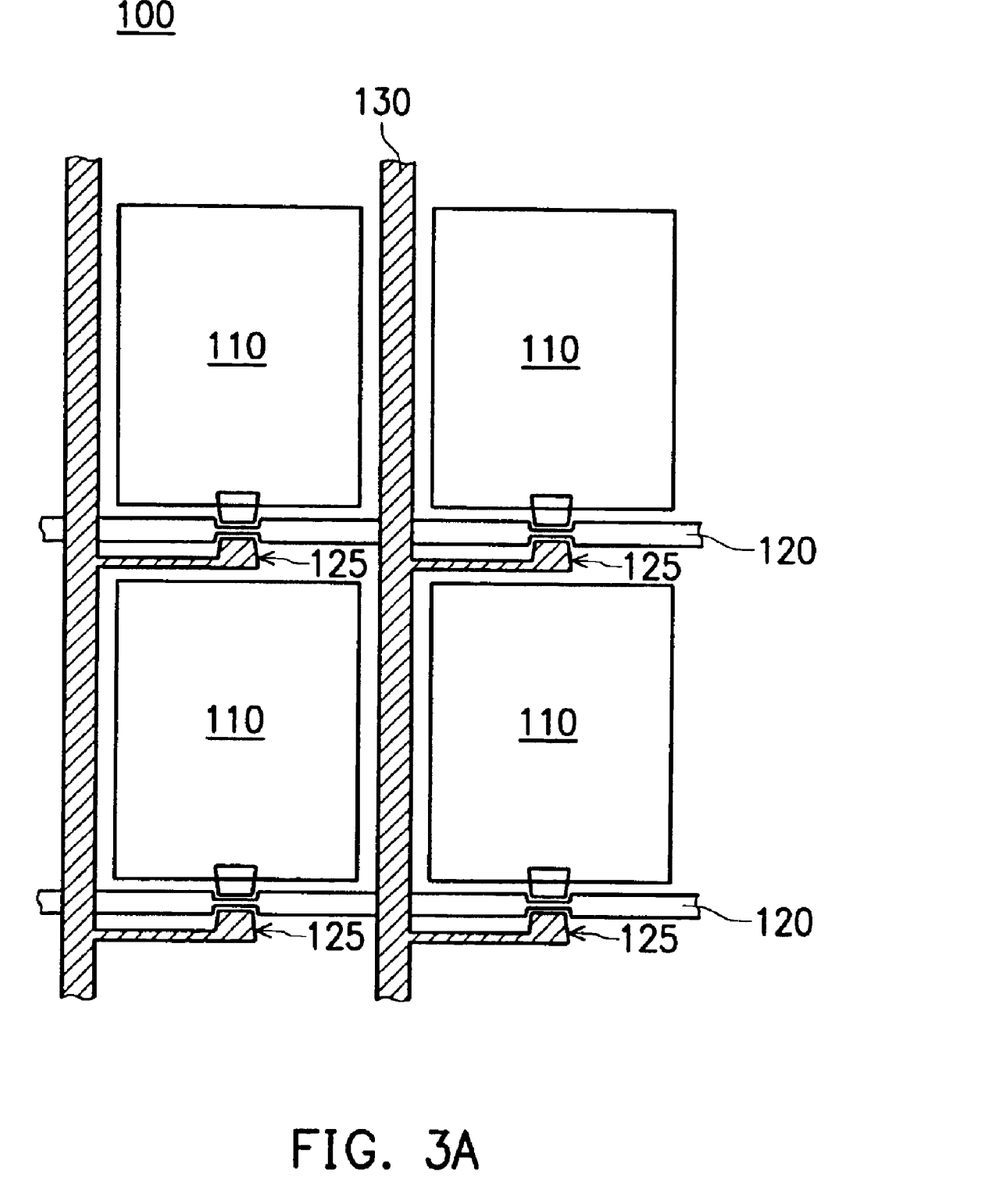
FIG. 3A to 3F are diagrams illustrating a manufacturing method of the first embodiment of the invention.
Figure 3B:
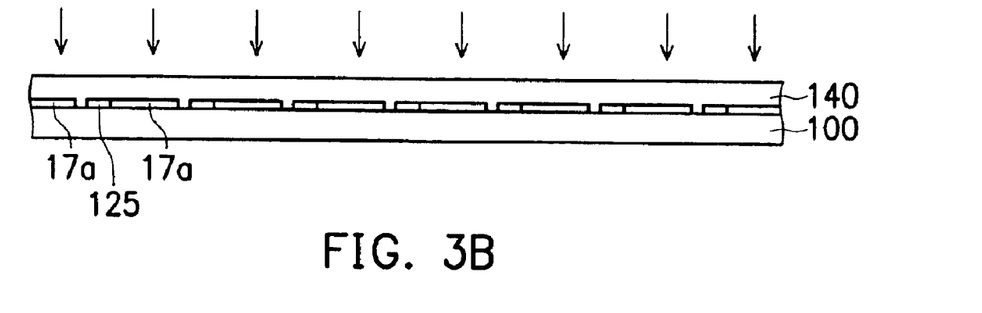
Figure 3C:
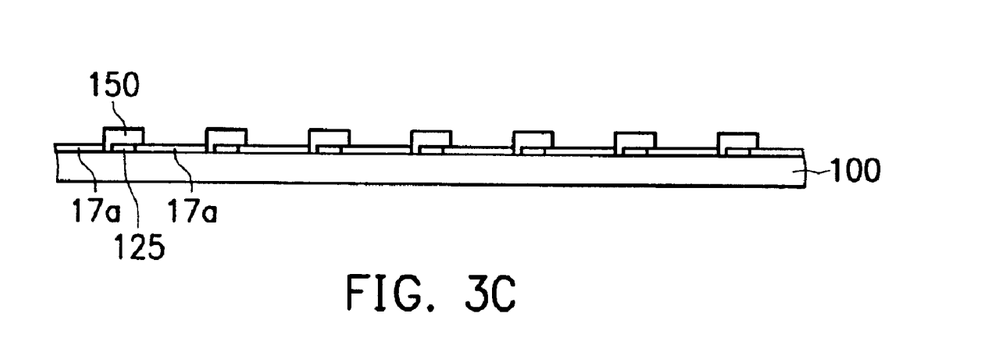
Figure 3D:
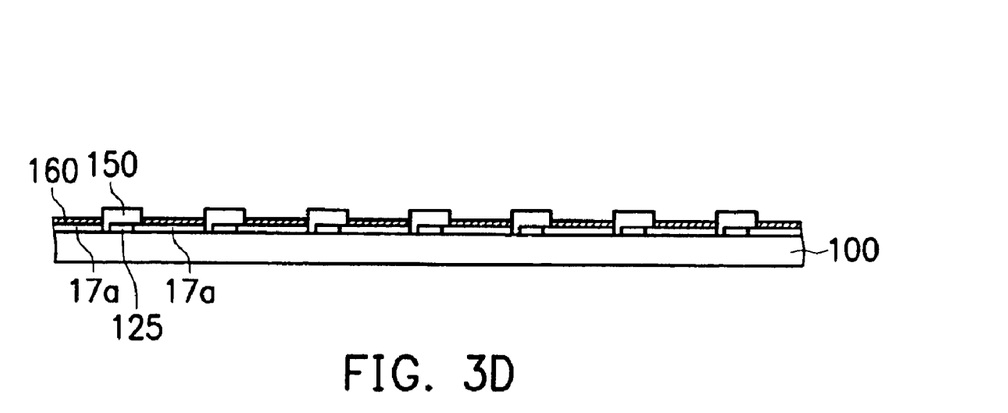

As shown in FIG. 3A, a plurality of pixels 110 are formed on a transparent substrate 100; wherein each pixel is surrounded by the gate lines 120 and the data lines 130, and a thin film transistor 125 is connected with the gate line 120. Next, as shown in FIG. 3B, a photoresist layer 140 is formed on the transparent substrate 100 to cover the thin film transistor 125 and a transparent electrode 17a. Next, a micro cell structure 150 surrounding at least one pixel is formed by photolithography; wherein the side wall of the micro cell structure 150 is formed over the gate line and data line and has a height of 3 to 5 μm. Next, as shown in FIG. 3C, the micro cell structures 150 surrounding each pixel have the same height by the planarization for the photoresist. Next, as shown in FIG. 3D, a first alignment layer 160 is formed on the transparent electrode 17a on the substrate 100 by Printing.

Figure 3E:
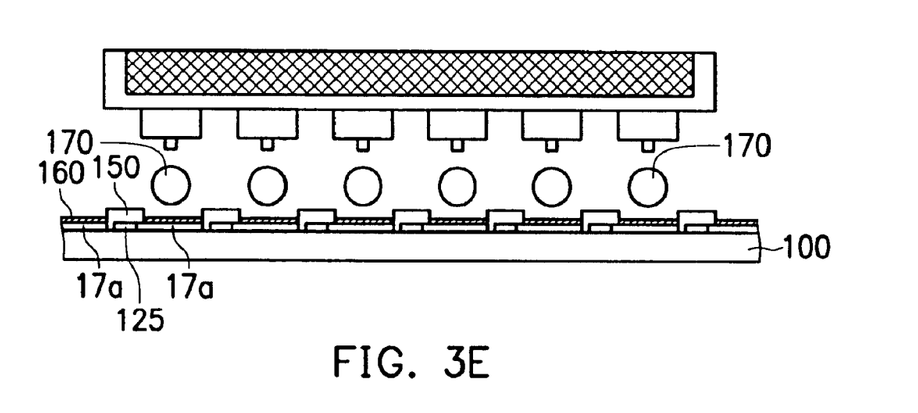

Next, as shown in FIG. 3E, the liquid crystal is provided within the micro cell structure by Ink Jet Printing technology. The Ink Jet Printing technology includes the thermal bubble type and micro piezoelectric type of Ink Jet Printing technology. In this embodiment, the liquid crystal material 170 can be injected into the micro cell structures 150 under the condition of normal, or low air pressure, or vacuum.

Figure 3F:
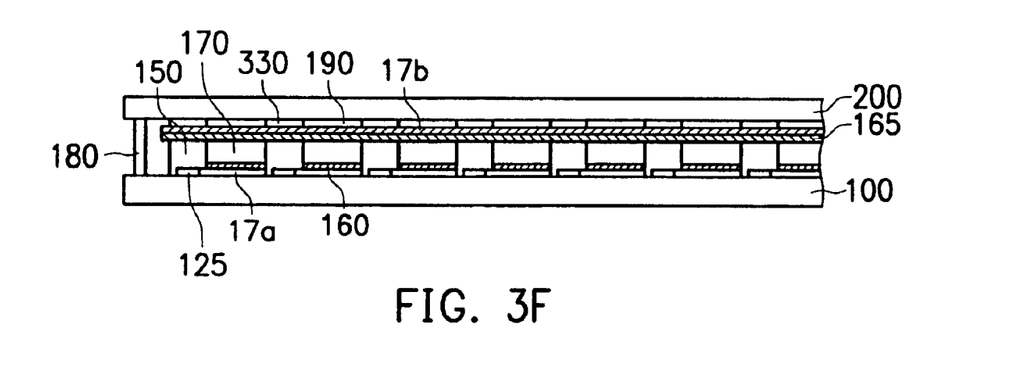

Next, as shown in FIG. 3F, another substrate 200 with a color filter 190 and second alignment layer 165 is combined with the substrate 100. In the embodiment, a sealing member 180 is formed on the edge of the substrate 100 and surrounds the micro cell structure before injecting the liquid crystal 170 into the micro cell structures, and then the substrate 100 with the sealing member 180 is combined with another substrate 200 under the condition of normal, low air pressure or vacuum. As well, a sealing member 180 can be formed on the edge of the substrate 100 and surrounds the micro cell structure after injecting the liquid crystal 170 into the micro cell structures, and then the substrate 100 with the sealing member 180 is combined with another substrate 200 under the condition of normal or low air pressure. Moreover, forming the sealing member 180 on the substrate 100 and providing the liquid crystal 170 within the micro cell structure can be accomplished at the same time, and then the two substrates 100, 200 are sealed together under the condition of normal or low air pressure.

Second Embodiment

Figure 4A:
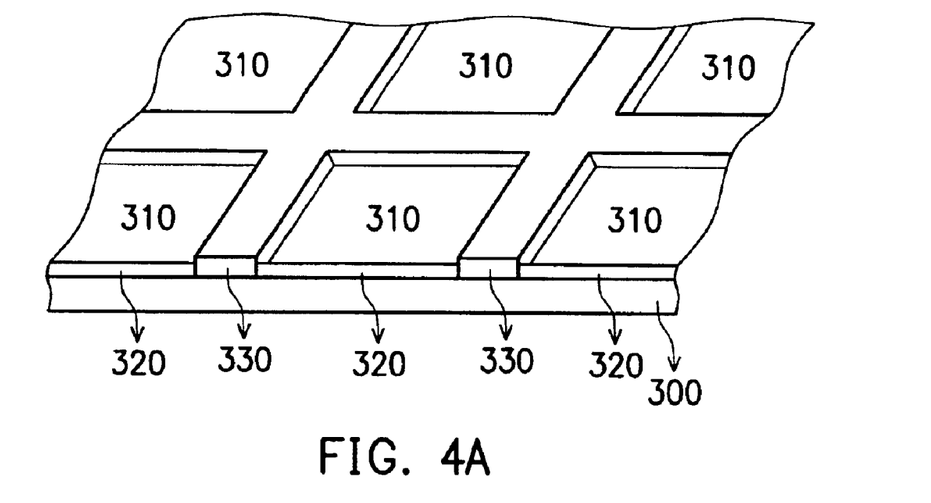
FIG. 4A to 4F are diagrams illustrating a manufacturing method of the second embodiment of the invention.
Figure 4B:
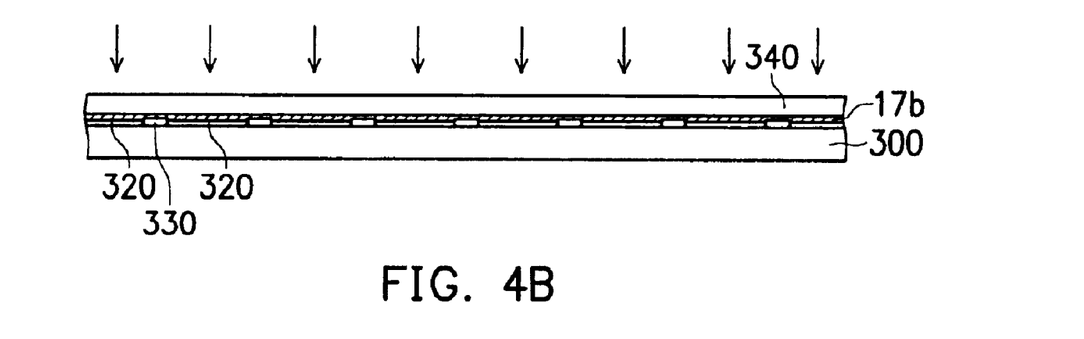
Figure 4C:
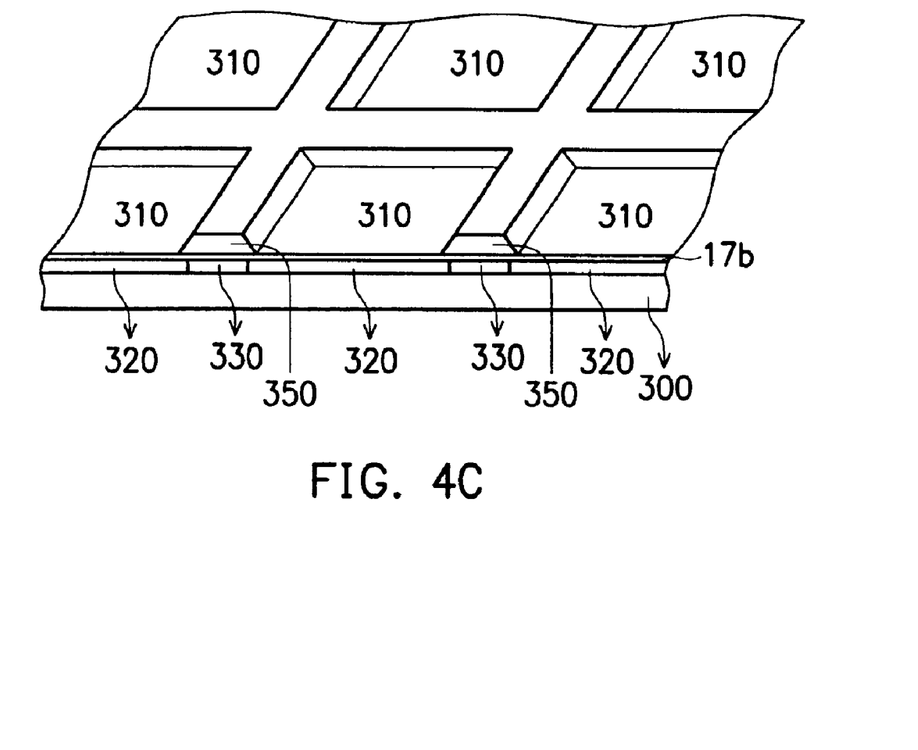
Figure 4D:
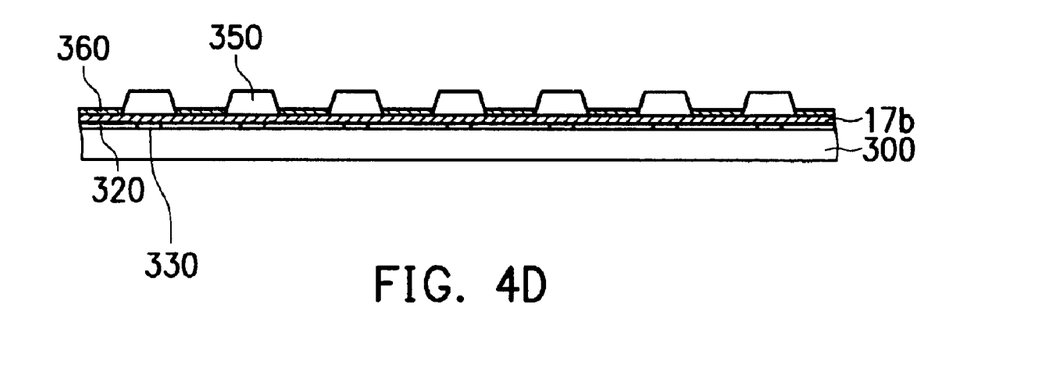

As shown in FIG. 4A, a plurality of pixels 310 are formed on a transparent substrate 300; wherein each pixel 310 has a transparent electrode 17b, a color filter 320 and a black matrix 330. The color filter 320 may be a red color filter, green color filter, or a blue color filter. Next, as shown in FIG. 4B, a transparent electrode 17b and photoresist layer 340 are sequentially formed on the transparent substrate 300. Next, as shown in FIG. 4C, a micro cell structure 350 surrounding the black matrix 330 of the pixel 310 is formed by photolithography on the photoresist layer 340. The side wall of the micro cell structure 350 is formed over black matrix 330 and has a height of 3 to 5 μm. The micro cell structure can be transparent or non-transparent material, and thus the micro cell structure can also be treated as part of the black matrix. Next, the micro cell structures 350 surrounding each pixel 310 have the same height by the planarization. Next, as shown in FIG. 3D, a first alignment layer 360 is formed on the substrate 300 by Printing.

Figure 4E:
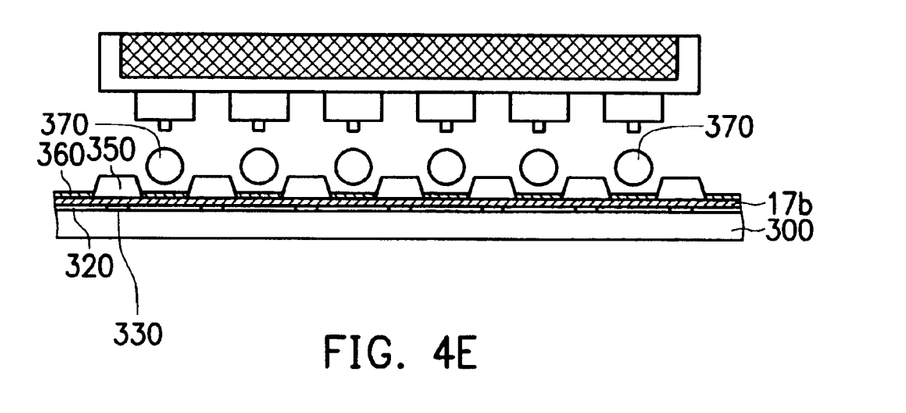

Next, as shown in FIG. 4E, the liquid crystal 370 is provided within the micro cell structure 350 by Ink Jet Printing technology, including thermal bubble type and micro piezoelectric type Ink Jet Printing technology. In this embodiment, the liquid crystal material 370 can be injected into the micro cell structures 350 under the condition of normal, low air pressure or vacuum.

Figure 4F:
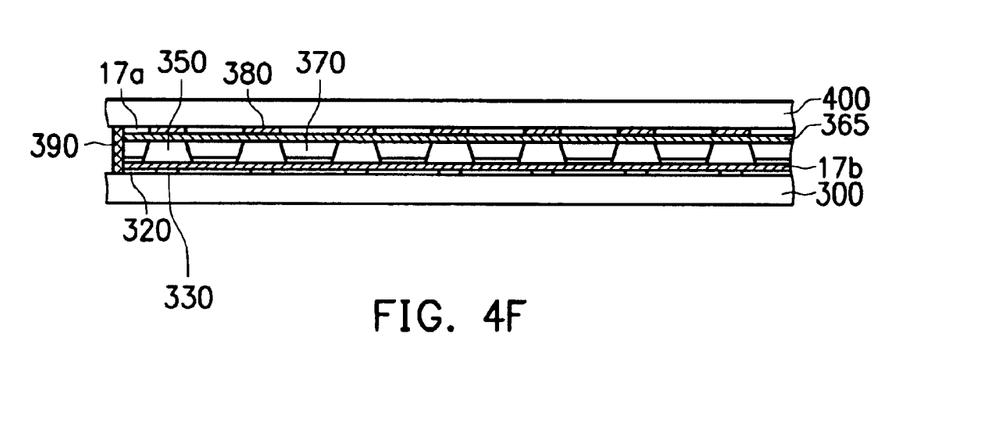
Figure 5A:
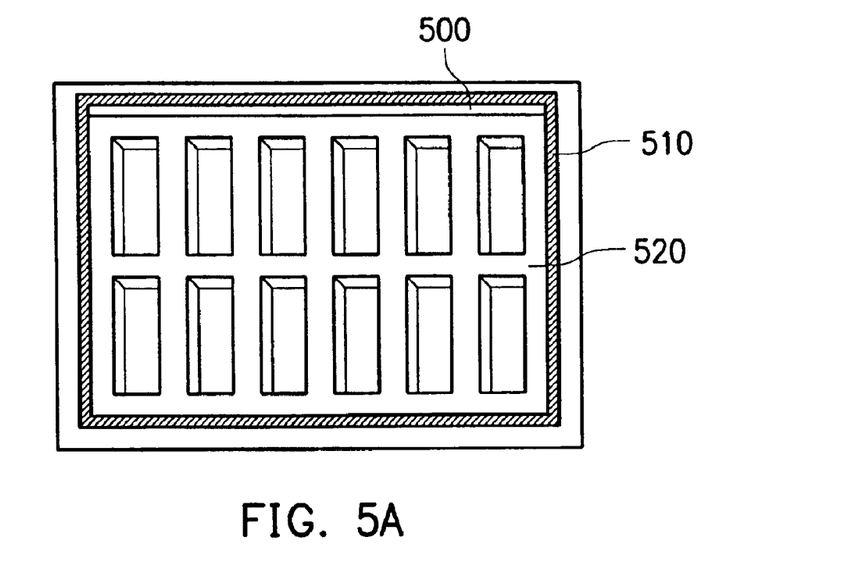
FIGS. 5A and 5D schematically shows a trench formed between the sealing member and the micro cell structure.
Figure 5B:
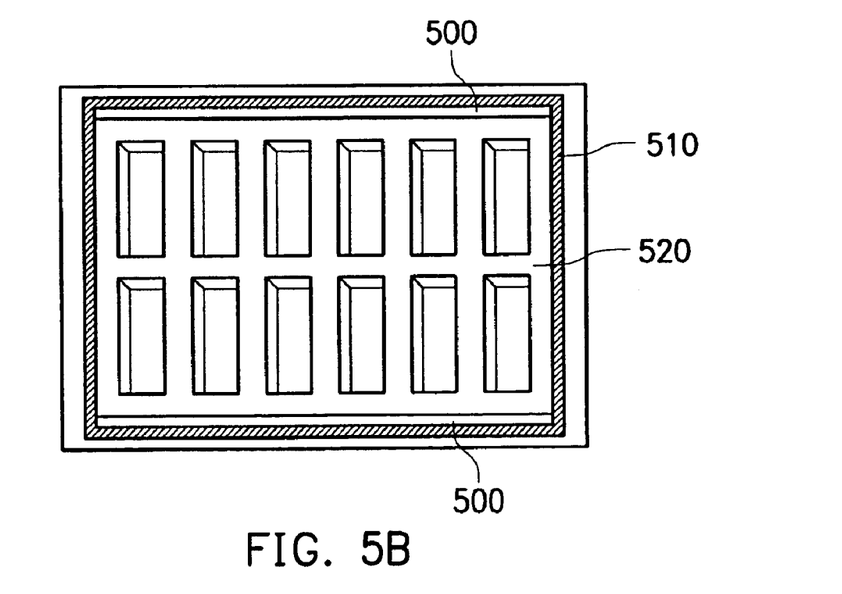
Figure 5C:
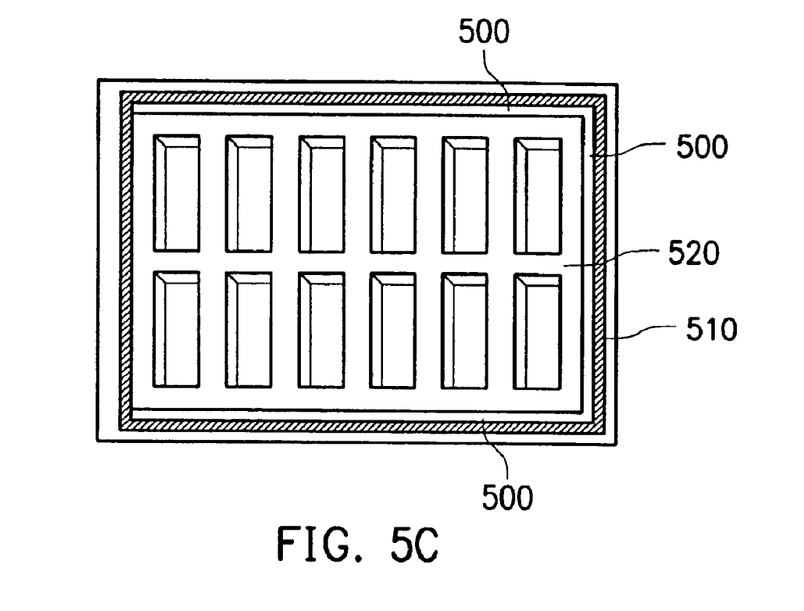
Figure 5D:
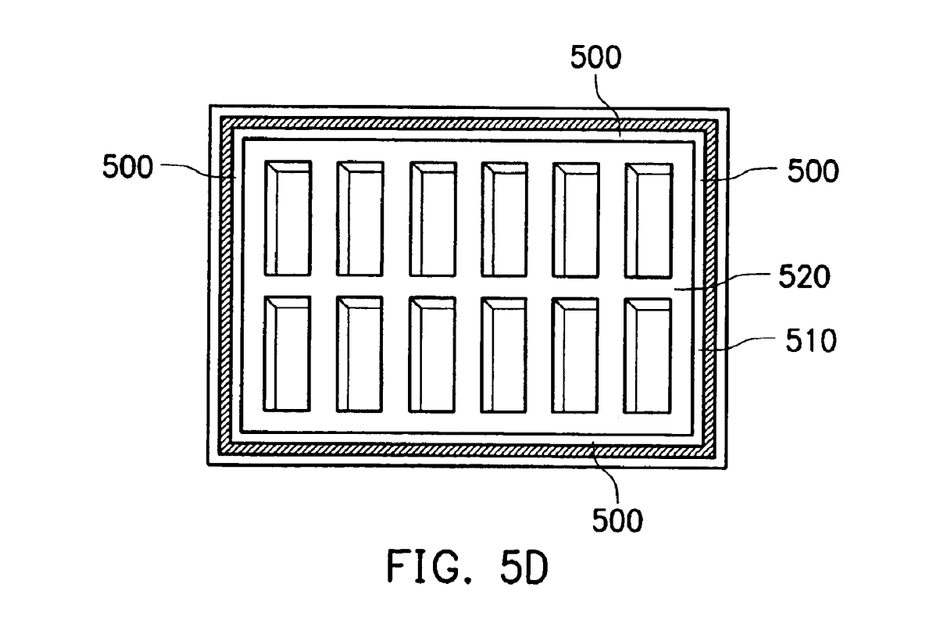

Next, as shown in FIG. 4F, another substrate 400 with a thin film transistor 380 and a second alignment layer 365 is combined with the substrate 300. In the embodiment, a sealing member 390 is formed on the edge of the substrate 300 and surrounds the micro cell structures before injecting the liquid crystal 370 into the micro cell structures, and then the substrate 300 with the sealing member 390 is combined with another substrate 400 under the condition of normal, low air pressure or vacuum. As well, a sealing member 390 can be formed on the edge of the substrate 300 and surrounds the micro cell structures after injecting the liquid crystal 370 into the micro cell structures, and then the substrate 300 with the sealing member 390 is combined with another substrate 400 under the condition of normal or low air pressure. Moreover, forming the sealing member 390 on the substrate 300 and providing the liquid crystal 370 within the micro cell structure can be accomplished at the same time, and then the two substrates 300, 400 are sealed together under the condition of normal or low air pressure.

As shown in FIG. 5A to 5D, in the invention, a trench 500 is formed between the sealing member 510 and the micro cell structure 520. The trench can exist at one side, two sides, three sides, or four sides, and contains the surplus liquid crystal overflowing the micro cell structure. Thus, the trench can prevent the surplus liquid crystal from squeezing.

Figure 6A:
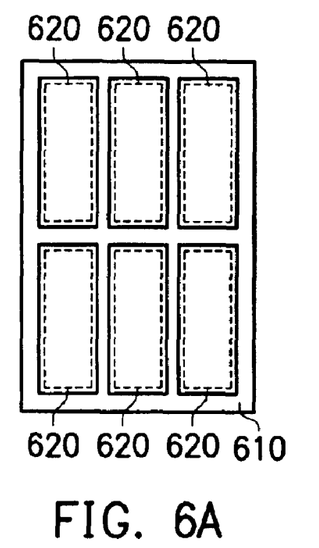
FIG. 6A to 6C are diagrams showing the micro cell structure surrounding at least one pixel.
Figure 6B:
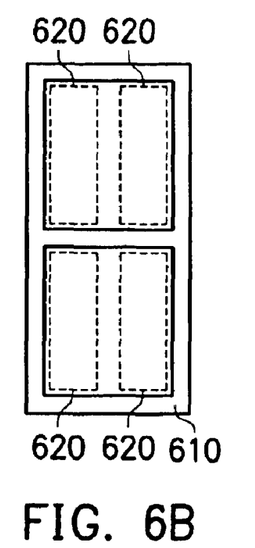
Figure 6C:
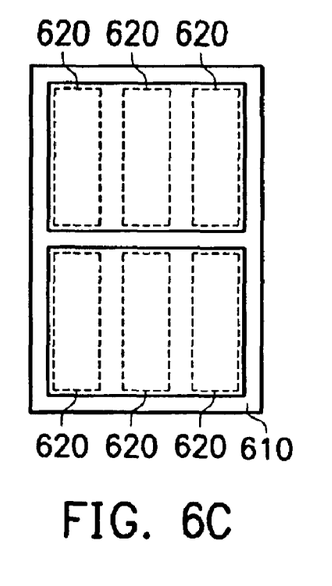

As show in FIG. 6A to 6C, in the invention, the micro cell structure further surrounds several pixels. The micro cell structure 610 surrounds at least one pixel (refer to dotted line) 620. Thus, as the area of the pixel becomes smaller, the liquid crystal material can be also provided within the micro cell structure.

Figure 7A:
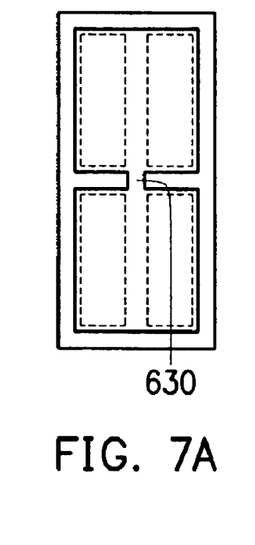
FIG. 7A to 7N are diagrams illustrating the micro cell structures connected by a passage.
Figure 7B:
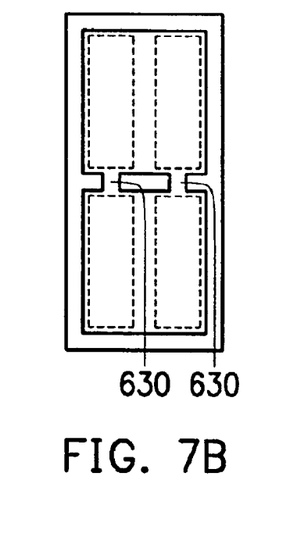
Figure 7C:
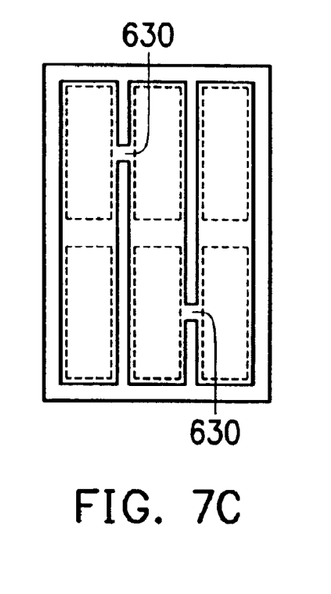
Figure 7D:
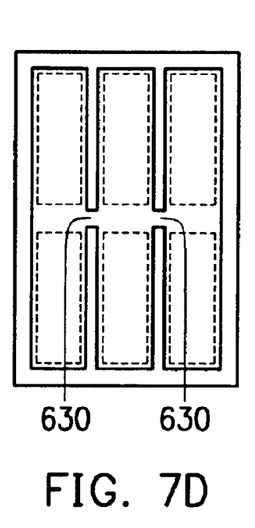
Figure 7E:
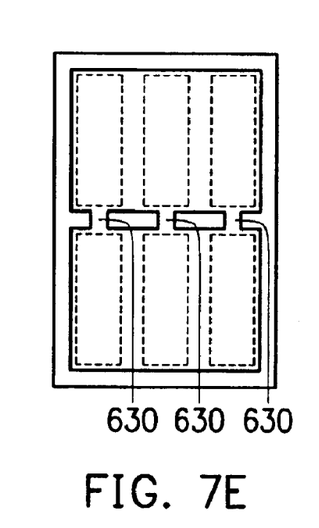
Figure 7F:
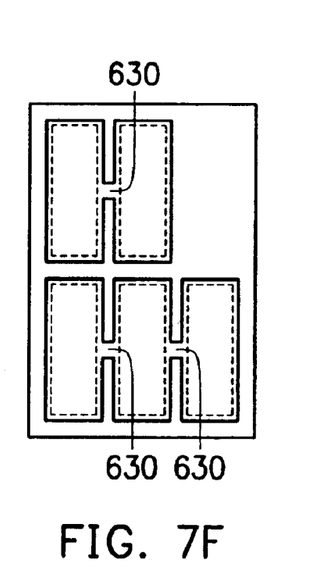
Figure 7G:
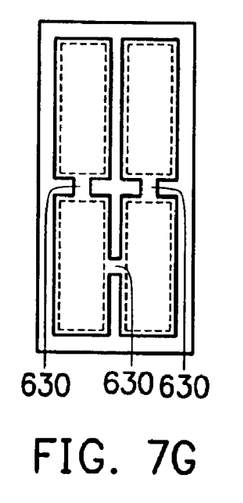
Figure 7H:
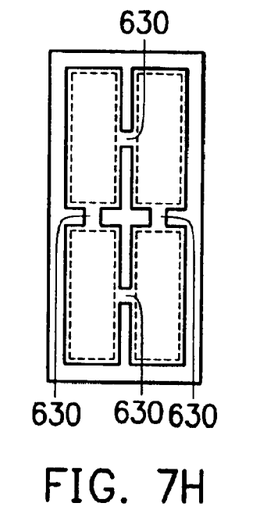
Figure 7I:
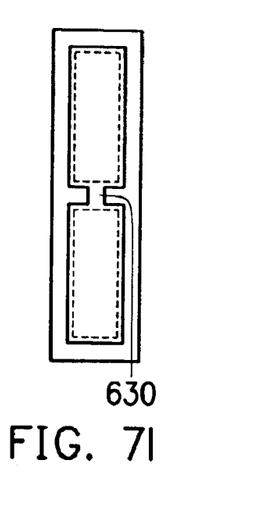
Figure 7J:
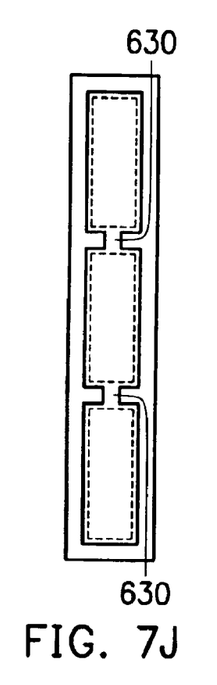
Figure 7K:
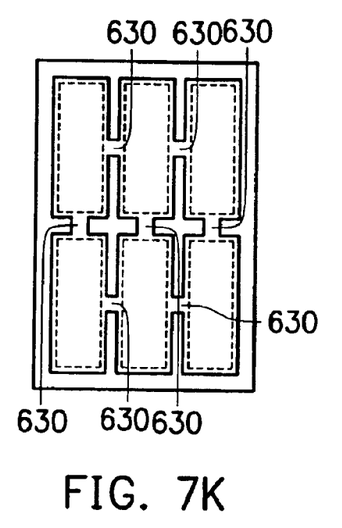
Figure 7L:
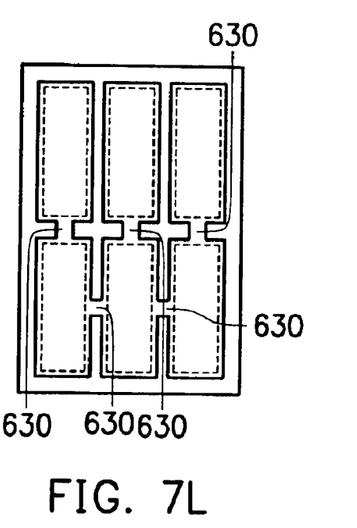
Figure 7M:
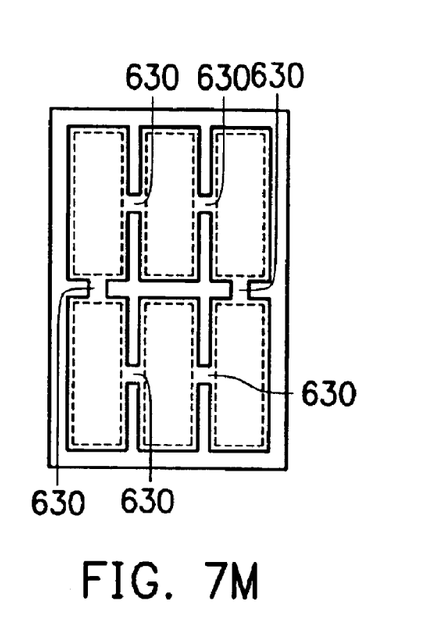
Figure 7N:
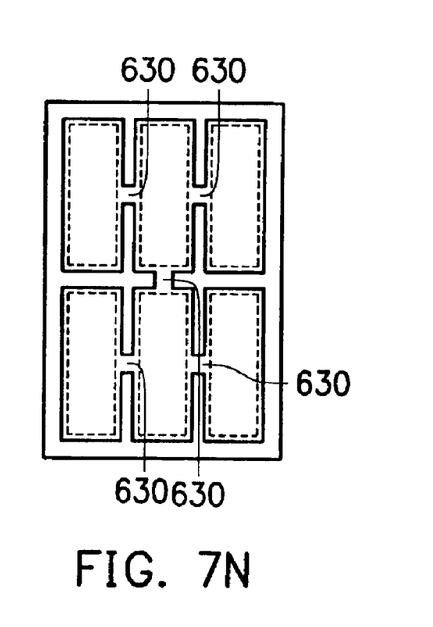
Figure 8A:
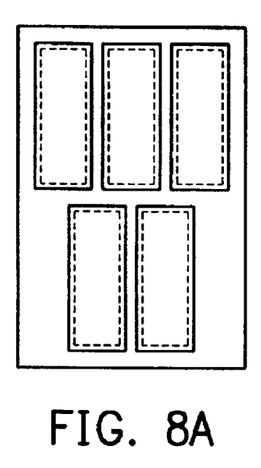
FIG. 8A to 8D schematically show different geometric shapes of the micro cell structures according with the geometric patterns of the pixels.
Figure 8B:
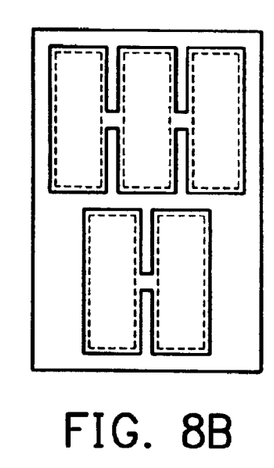
Figure 8C:
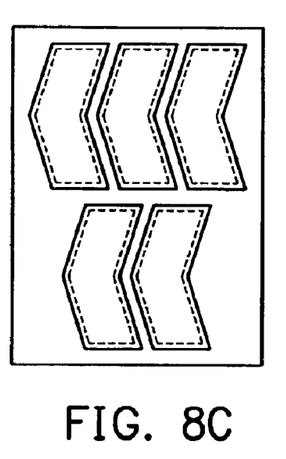
Figure 8D:
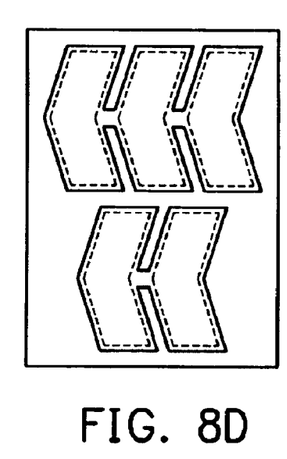

As shown in FIG. 7A to 7N, in the invention, the adjacent micro cell structures are connected by a passage 630. When the liquid crystal is provided within one micro cell structure, the liquid crystal can uniformly fill other micro cell structure by the passages.

As shown in FIG. 8A to 8D, in the invention, the geometric shape of the micro cell structure is formed by the accordance of the geometric pattern of the pixel. For example, the geometric shape of the micro cell structure may be rectangular, V-shaped, or other profiles.

Figure 9:
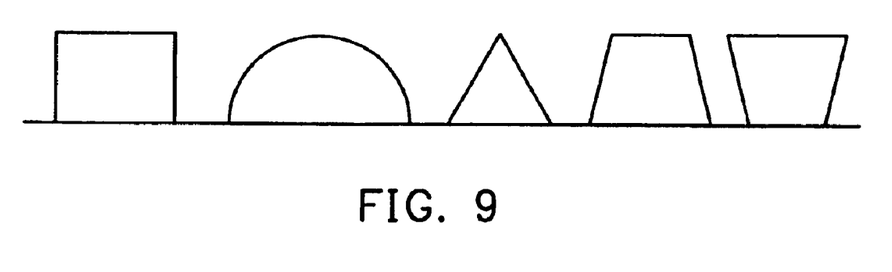
FIG. 9 is a cross-section of the micro cell structure.

As shown in FIG. 9, in the invention, the cross-sectional diagram of the micro cell structure may be rectangular, semicircular, triangular, trapezoid, or other profiles.

Figure 10A:
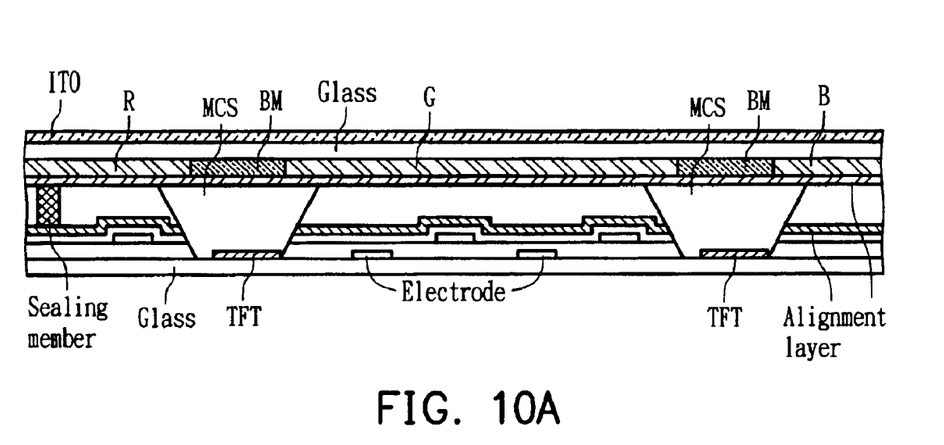
FIG. 10A schematically shows an In-plane Switching mode of the liquid crystal display panel.
Figure 10B:
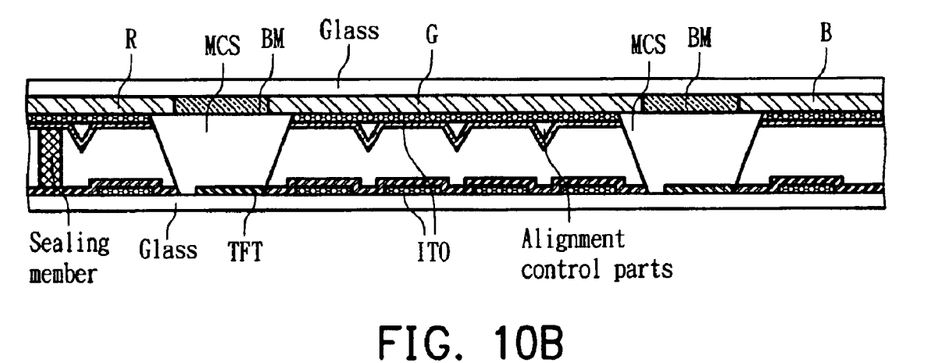
FIG. 10B schematically shows a Vertical Alignment mode of the liquid crystal display panel.

In the invention, the micro cell structure can apply to the liquid crystal display panel of Twisted Nematic mode (refer to TN mode), In-plane Switching mode (refer to IPS mode) shown in FIG. 10A, or Vertical Alignment mode (refer to VA mode) shown in FIG. 10B.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A method of manufacturing a liquid crystal display panel, comprising the steps of:
   forming a plurality of pixels on a first substrate;
   forming a plurality of micro cell structures on the first substrate, wherein each micro cell structure surrounds at least one pixel;
   forming a first alignment layer on the first substrate;
   providing the micro cell structures with a liquid crystal utilizing Ink Jet Printing technology at the condition of normal air pressure; and
   combining the first substrate with a second substrate by a sealing member at the condition of vacuum.

2. A method of manufacturing a liquid crystal display panel as claimed in claim 1, wherein the pixel comprises a data line and a gate line.

3. A method of manufacturing a liquid crystal display panel as claimed in claim 2, further comprising the steps of:

forming a photoresist layer on the first substrate; and forming the micro cell structures on the data lines and the gate lines by carrying out the photolithography on the photoresist layer.

4. A method of manufacturing a liquid crystal display panel as claimed in claim 3, wherein all the micro cell structures have the same height by planarization.

5. A method of manufacturing a liquid crystal display panel as claimed in claim 3, further comprising a step of: forming a color filter and a second alignment layer on the second substrate.

6. A method of manufacturing a liquid crystal display panel as claimed in claim 1, wherein each pixel comprises a color filter and a black matrix surrounding the pixel.

7. A method of manufacturing a liquid crystal display panel as claimed in claim 6, further comprising the steps of:

forming a photoresist layer on the first substrate; and forming the micro cell structures covering the black matrix by carrying out the photolithography on the photoresist layer.

8. A method of manufacturing a liquid crystal display panel as claimed in claim 7, wherein all the micro cell structures have the same height by planarization.

9. A method of manufacturing a liquid crystal display panel as claimed in claim 7, further comprising a step of: forming a plurality of pixels and a second alignment layer on the second substrate, wherein each pixel has a data line and a gate line.

10. A method of manufacturing a liquid crystal display panel as claimed in claim 1, wherein the adjacent micro cell structures surround micro cell spaces connected by a passage.

11. A method of manufacturing a liquid crystal display panel as claimed in claim 1, wherein the Ink Jet Printing technology is a thermal bubble type Ink Jet Printing technology.

12. A method of manufacturing a liquid crystal display panel as claimed in claim 1, wherein the Ink Jet Printing technology is a micro piezoelectric type Ink Jet Printing technology.

13. A method of manufacturing a liquid crystal display panel as claimed in claim 1, wherein the sealing member is prepared before injecting the liquid crystal into the micro cell structures.

14. A method of manufacturing a liquid crystal display panel as claimed in claim 1, wherein the sealing member is prepared after injecting the liquid crystal into the micro cell structures.

15. A method of manufacturing a liquid crystal display panel as claimed in claim 1, wherein the sealing member is prepared when the liquid crystal is injected into the micro cell structures.

16. A method of manufacturing a liquid crystal display panel as claimed in claim 1, further comprising a step of: forming a trench between the sealing member and the micro cell structures.

17. A method of manufacturing a liquid crystal display panel, comprising the steps of:

forming a plurality of pixels on a first substrate;

forming a plurality of micro cell structures on the first substrate, wherein each micro cell structure surrounds at least one pixel;

forming a first alignment layer on the first substrate;

providing the micro cell structures with a liquid crystal utilizing Ink Jet Printing technology at the condition of vacuum; and combining the first substrate with a second substrate by a sealing member at the condition of normal air pressure.

18. A method of manufacturing a liquid crystal display panel as claimed in claim 17, wherein each pixel comprises a color filter and a black matrix surrounding the pixel.

19. A method of manufacturing a liquid crystal display panel as claimed in claim 18, further comprising the steps of:

forming a photoresist layer on the first substrate; and forming the micro cell structures covering the black matrix by carrying out the photolithography on the photoresist layer.

20. A method of manufacturing a liquid crystal display panel as claimed in claim 19, wherein all the micro cell structures have the same height by planarization.

21. A method of manufacturing a liquid crystal display panel as claimed in claim 19, further comprising a step of: forming a plurality of pixels and a second alignment layer on the second substrate, wherein each pixel has a data line and a gate line.

22. A method of manufacturing a liquid crystal display panel as claimed in claim 17, wherein the adjacent micro cell structures surround micro cell spaces connected by a passage.

23. A method of manufacturing a liquid crystal display panel as claimed in claim 17, wherein the Ink Jet Printing technology is a thermal bubble type Ink Jet Printing technology.

24. A method of manufacturing a liquid crystal display panel as claimed in claim 17, wherein the Ink Jet Printing technology is a micro piezoelectric type Ink Jet Printing technology.

25. A method of manufacturing a liquid crystal display panel as claimed in claim 17, wherein the sealing member is prepared before injecting the liquid crystal into the micro cell structures.

26. A method of manufacturing a liquid crystal display panel as claimed in claim 17, wherein the sealing member is prepared after injecting the liquid crystal into the micro cell structures.

27. A method of manufacturing a liquid crystal display panel as claimed in claim 17, wherein the sealing member is prepared when the liquid crystal is injected into the micro cell structures.

28. A method of manufacturing a liquid crystal display panel as claimed in claim 17, further comprising a step of: forming a trench between the sealing member and the micro cell structures.

* * * * *